(12) United States Patent
Braun et al.

(10) Patent No.: US 9,309,365 B2
(45) Date of Patent: Apr. 12, 2016

(54) PS FOAMS WITH LOW METAL CONTENT

(75) Inventors: Frank Braun, Ludwigshafen (DE); Ingo Bellin, Mannheim (DE); Klaus Hahn, Kirchheim (DE)

(73) Assignee: BASF SE (DE)

( * ) Notice: Subject to any disclaimer, the term of this patent is extended or adjusted under 35 U.S.C. 154(b) by 965 days.

(21) Appl. No.: 12/990,615

(22) PCT Filed: Apr. 30, 2009

(86) PCT No.: PCT/EP2009/055250
§ 371 (c)(1),
(2), (4) Date: Nov. 1, 2010

(87) PCT Pub. No.: WO2009/133167
PCT Pub. Date: Nov. 5, 2009

(65) Prior Publication Data
US 2011/0042606 A1    Feb. 24, 2011

(30) Foreign Application Priority Data
May 2, 2008 (EP) .................. 08155586

(51) Int. Cl.
C08J 9/00 (2006.01)
(52) U.S. Cl.
CPC .............. C08J 9/0019 (2013.01); C08J 9/0066 (2013.01); *C08J 2325/04* (2013.01)
(58) Field of Classification Search
CPC ..... C08J 9/0019; C08J 9/0066; C08J 2325/04
USPC ............... 521/146, 50, 142; 252/62; 524/495; 526/347.2
See application file for complete search history.

(56) References Cited

U.S. PATENT DOCUMENTS

| 6,130,265 | A | 10/2000 | Glueck et al. |
| 6,340,713 | B1 * | 1/2002 | Gluck et al. ................. 521/60 |
| 6,420,442 | B1 * | 7/2002 | Dietzen et al. ................ 521/82 |
| 8,076,380 | B2 * | 12/2011 | Noordegraaf ................. 521/56 |
| 2004/0039073 | A1 | 2/2004 | Gluck |
| 2006/0276557 | A1 | 12/2006 | Ponticiello et al. |
| 2007/0142488 | A1 * | 6/2007 | Datko et al. ................. 521/142 |
| 2008/0096988 | A1 * | 4/2008 | Hahn et al. ................. 521/56 |

FOREIGN PATENT DOCUMENTS

| DE | 19828250 A1 | 12/1999 |
| EP | 0915 127 A2 | 5/1999 |
| EP | 1693413 A1 * | 8/2006 |
| JP | 2005002268 A | 1/2005 |
| WO | WO-9745477 A1 | 12/1997 |
| WO | WO-2004087798 A1 | 10/2004 |
| WO | WO-2006108672 A2 | 10/2006 |

OTHER PUBLICATIONS

English language translation of the International Preliminary Report on Patentability issued in related International Application No. PCT/EP2009/055250, mailed Feb. 9, 2011.

* cited by examiner

*Primary Examiner* — Irina S Zemel
(74) *Attorney, Agent, or Firm* — Drinker Biddle & Reath LLP

(57) ABSTRACT

The present invention relates to an expandable styrene polymer, comprising at least one flame retardant as component (A), from 0.0001 to 2% by weight, based on component (A), of at least one metal as component (B), and athermanous particles as component (C), to a process for the production of this expandable styrene polymer, to an expanded styrene polymer bead, comprising at least one flame retardant as component (A), from 0.0001 to 2% by weight, based on component (A), of at least one metal as component (B), and athermanous particles as component (C), to a process for the production of this expanded styrene polymer bead, to a foam, capable of production from this expandable styrene polymer, to a process for the production of this foam, and also to the use of this foam for thermal insulation, including that of machines and of household devices, and as packaging material.

12 Claims, No Drawings

PS FOAMS WITH LOW METAL CONTENT

CROSS REFERENCE TO RELATED APPLICATIONS

This application is a national phase of PCT/EP2009/055250, filed on Apr. 30, 2009, which claims priority to EP 08155586.4, filed May 2, 2008, the entire contents of all are hereby incorporated by reference.

The present invention relates to an expandable styrene polymer, comprising at least one flame retardant as component (A), from 0.0001 to 2% by weight, based on component (A), of at least one metal as component (B), and athermanous particles as component (C), to a process for the production of this expandable styrene polymer, to an expanded styrene polymer bead, comprising at least one flame retardant as component (A), from 0.0001 to 2% by weight, based on component (A), of at least one metal as component (B), and athermanous particles as component (C), to a process for the production of this expanded styrene polymer bead, to a foam, capable of production from the expandable styrene polymer, to a process for the production of this foam, and also to the use of this foam for thermal insulation, including that of machines and of household devices, and as packaging material.

Expandable styrene polymers, comprising at least one flame retardant, are known from the prior art.

JP 2005-00 22 68 A1 discloses a styrene-based foam which comprises graphite powder as athermanous particles. The density of the foam is from 10 to 100 kg/m$^2$ and its average cell radius is from 20 μm to 1000 μm.

WO 2004/087798 A1 discloses an expandable vinylaromatic polymer and a process for its production. The polymer of the specification mentioned comprises a matrix based on vinylaromatic monomers, from 1 to 10% by weight of a blowing agent, and from 0.01 to 20% by weight, based on the polymer, of carbon black as athermanous particles.

EP 0 981 575 B1 discloses a process for the production of expandable styrene polymers comprising graphite particles, via polymerization of styrene in aqueous suspension in the presence of graphite particles.

A disadvantage of the processes of the prior art and, respectively, the known expandable styrene polymers is that the presence of metals often has an effect on the preparation process for the polystyrene foams, and thus on their properties. By way of example, in the case of free-radical polymerization in suspension, the reaction parameters depend on the metal content of the reaction solution. Furthermore, in the case of preparation via extrusion, the relatively high temperature can cause increased degradation of the polymers. By virtue of these adverse effects of the metals present during the preparation process, the styrene-comprising foams obtained have an unsatisfactory property profile, for example in relation to their mechanical properties. The fire performance of flame-retardant polystyrene foams can moreover be adversely affected when flame retardants are used, if excessive amounts of metals are present in the foam.

It is therefore an object of the present invention to provide flame-retardant, expandable styrene polymers which, in comparison with the expandable styrene polymers known from the prior art, have improved properties, in particular mechanical properties, or flame-inhibiting action. In particular, an object of the present invention is to provide expandable styrene polymers which have advantageous fire performance, where this also applies when athermanous particles are present in the styrene polymers.

These are achieved via an expandable styrene polymer, comprising at least one flame retardant as component (A), from 0.0001 to 2% by weight, based on component (A), of at least one metal as component (B), and athermanous particles as component (C).

In one particularly preferred embodiment, the styrene polymer is a styrene homopolymer or a styrene copolymer having up to 40% by weight, based on the weight of the polymer, of at least one further ethylenically unsaturated monomer, in particular alkylstyrenes, such as divinylbenzene, para-methyl-alpha-methylstyrene, alpha-methylstyrene, or acrylonitrile, butadiene, acrylate or methacrylate. Blends composed of polystyrene with other polymers are also possible, in particular with rubber and polyphenylene ether.

In one particularly preferred embodiment, the expandable styrene polymer of the invention has been selected from the group consisting of styrene polymers, impact-resistant polystyrene, anionically polymerized impact-resistant polystyrene, styrene-acrylonitrile polymers (SAN), acrylonitrile-butadiene-styrene polymers (ABS), acrylonitrile-styrene-acrylate polymers (ASA), methyl acrylate-butadiene-styrene polymers (MBS), methyl methacrylate-acrylonitrile-butadiene-styrene polymers (MABS), alpha-methylstyrene-acrylonitrile polymers (AMSAN), para-methyl-alpha-methylstyrene-acrylonitrile polymers (MAMSAN), and mixtures thereof. In one preferred embodiment, polystyrene is used.

It is possible that mixtures of two or more of the styrene polymers mentioned are present. The weight-average molar mass of the polymers used is generally from 50 000 to 500 000 g/mol, preferably from 70 000 to 400 000 g/mol.

The expandable styrene polymer of the invention comprises at least one flame retardant as component (A). The at least one flame retardant has preferably been selected from halogen- or phosphorus-containing compounds or substances. The flame retardant used particularly preferably comprises organic bromine compounds. The organic bromine compounds are intended to have a bromine content of ≤40% by weight. Particularly suitable compounds are aliphatic, cycloaliphatic, and aromatic bromine compounds, such as hexabromocyclododecane (HBCD), pentabromomono-chlorocyclohexane, pentabromophenyl allyl ether, 2,2',6,6'-tetrabromobisphenol A bisallyl ether, N-2,3-dibromopropyl-4,5-dibromohexahydrophthalimide, and mixtures thereof.

Examples of suitable phosphorus-containing compounds or substances are phosphates, such as trimethyl phosphate, triethyl phosphate, tributyl phosphate, tributoxyethyl phosphate, triphenyl phosphate, tricresyl phosphate, tris(chloroethyl)phosphate, tris(dichloropropyl)phosphate, tris(chloropropyl)phosphate or tris(2,3-dibromopropyl)phosphate, or red phosphorus.

According to the invention, it is also possible to use mixtures of the flame retardants mentioned. In one particularly preferred embodiment, the at least one flame retardant is hexabromocyclododecane (HBCD).

The action of the bromine-containing flame retardants is considerably improved via addition of C—C- or O—O-labile organic compounds. Examples of these flame retardant synergists are dicumyl and dicumyl peroxide. One preferred combination comprises from 0.1 to 5% by weight, based on the expandable styrene polymer, of organic bromine compounds and from 0.05 to 1.0% by weight, based on the expandable styrene polymer, of the C—C- or O—O-labile organic compounds.

The expandable styrene polymer of the invention generally comprises from 0.0001 to 2% by weight, preferably from 0.001 to 1% by weight, particularly preferably from 0.01 to 0.8% by weight, very particularly preferably from 0.02 to 0.5% by weight, based in each case on component (A), of at least one metal as component (B).

The at least one metal present as component (B) can be present in elemental form or as compound. According to the invention, the amount stated here is always based on the metal in elemental form, for example determined via elemental analysis. If a plurality of metals is present in the expandable styrene polymer of the invention, the quantities stated are based on the entirety of the metals present.

The amounts present in the expandable styrene polymer of the invention of at least one flame retardant as component (A) and of at least one metal as component (B) result in a ratio by weight of at least one flame retardant of at least one metal which is generally greater than 50, preferably greater than 100, particularly preferably greater than 125, very particularly preferably greater than 200. The amount of at least one flame retardant present in the expandable styrene polymer of the present invention has been coupled to the amount of metal present. If the amount of metal in the styrene polymer of the invention is small, the amount of at least one flame retardant can also be selected to be small. If the amount of metal in the styrene polymer of the invention is relatively great, the amount of at least one flame retardant also has to be appropriately adapted so as to achieve the advantages of the invention. In every case, the amount of metal present as component (B) in the expandable styrene polymer of the invention is at most 2% by weight, based on component (A).

According to the invention, it is preferable that the at least one metal is not separately added to the styrene polymer; instead, the metal which is, if appropriate, present generally passes in the form of contamination into the expandable styrene polymer of the invention. By way of example, metals pass into the product by mechanical means and/or via corrosion, via abrasion of steel, for example from the extruder, tank, sieve, etc., during the production of the expandable styrene polymer. Another source of the metal present, if appropriate, in the expandable styrene polymer of the invention is provided by the substances introduced into the reaction for the production of the styrene polymer, for example the athermanous particles present, such as graphite or carbon black.

The at least one metal present, if appropriate, in the expandable styrene polymer of the invention has preferably been selected from the group consisting of aluminum, titanium, scandium, vanadium, chromium, manganese, iron, cobalt, nickel, copper, yttrium, zirconium, niobium, molybdenum, ruthenium, rhodium, palladium, silver, hafnium, tantalum, tungsten, rhenium, osmium, iridium, platinum, gold, cerium, and mixtures thereof. In one particularly preferred embodiment of the styrene polymer of the invention, the at least one metal has been selected from the group consisting of iron, copper, molybdenum, zirconium, and mixtures thereof.

By virtue of the very small amount according to the invention of at least one metal, based on the at least one flame retardant, in the styrene polymer, this polymer features very good mechanical properties in conjunction with good thermal insulation and high flame, retardancy. The particularly good flame retardancy of the expandable styrene polymers of the invention can, for example, be expressed by the fact that they pass the DIN 4102 B2 fire test. The advantages of the expandable styrene polymers of the invention also give rise to these advantageous properties in expanded styrene polymers and, respectively, foams of the invention, capable of preparation from these expandable styrene polymers.

The expandable styrene polymer of the invention comprises athermanous particles as component (C), for example selected from the group consisting of non-metal oxides, such as $SiO_2$, carbon, such as carbon black, graphite, diamond, and organic dyes and, respectively, dye pigments and mixtures of these. Organic dyes that can be used are in particular those which exhibit absorbent and/or reflective behavior in the infrared region. The abovementioned materials can be used either alone or else in combination, i.e. in the form of a mixture composed of a plurality of materials. In one preferred embodiment, the athermanous particles in the styrene polymer of the invention are graphite.

In one preferred embodiment, the carbon blacks, graphites, or carbon materials used as athermanous particles comprise an amount of less than 5000 ppm of metals, particularly preferably of less than 1000 ppm, very particularly preferably less than 500 ppm, with particular preference less than 100 ppm.

The primary particle size of carbon black that can be used in the invention is preferably from 1 to 1000 nm, particularly preferably from 5 to 500 nm. The DBP absorption of the carbon blacks preferably used, measured to ASTM D2414, is from 10 to 300 mL/100 g, particularly preferably from 20 to 200 mL/100 g. The surface area of the carbon blacks preferably used, in each case measured to ASTM D6556, is preferably from 2 to 400 $m^2/g$, particularly preferably from 5 to 200 $m^2/g$.

The average particle size of graphite that can be used in the invention is preferably from 0.1 to 50 µm, in particular from 1 to 12 µm, its bulk density being from 100 to 800 g/l and its specific surface area being from 1 to 20 $m^2/g$. Natural graphite, synthetic graphite, or expandable graphite can be used. The ash content of the graphite preferably used, determined to DIN 51903, is generally from 0 to 15% by weight, preferably from 0.005 to 10% by weight, particularly preferably from 0.01 to 8% by weight.

The amount generally present of the athermanous particles in the expandable styrene polymer of the invention is from 0.05 to 30% by weight, particularly preferably from 0.1 to 20% by weight, based in each case on the expandable styrene polymer.

The athermanous particles that can be used in the invention as component (C) can be of regular and/or irregular shape. The athermanous particles can be produced by any of the processes known to the person skilled in the art, and/or are commercially available.

The expandable styrene polymers of the invention can moreover comprise the auxiliaries and additives which are conventional and known to the person skilled in the art, for example nucleating agents, UV stabilizers, chain-transfer agents, blowing agents, plasticizers, coating agents, hydrophobing agents, and/or antioxidants. According to the invention, care is to be taken here that the proportion of at least one metal of from 0.0001 to 2% by weight, based on the at least one flame retardant, is not exceeded. In one preferred embodiment, the expandable styrene polymer of the invention comprises no fillers, in particular no metal-containing fillers, i.e. the amount of fillers, in particular of metal-containing fillers, in the expandable styrene polymer of the invention is below the analytical detection limit. The person skilled in the art knows of suitable analytical methods.

The present invention also provides a process for the production of the expandable styrene polymer of the invention, via mixing of the expandable styrene polymer, of the at least one flame retardant as component (A), and of the athermanous particles as component (C), where from 0.0001 to 2% by weight, based on component (A), of at least one metal is present as component (B).

The mixing of the at least one styrene polymer with at least one flame retardant, with athermanous particles, and, if appropriate, with further components takes place by the processes described below.

In one preferred embodiment, the at least one flame retardant, athermanous particles, and, if appropriate, further components are mixed with a melt of the styrene polymer, for example in an extruder. A blowing agent is so metered simultaneously here into the melt. It is also possible to incorporate the at least one flame retardant, athermanous particles, and, if appropriate, further components into a melt of styrene polymer comprising blowing agent, and it is advantageous here to use marginal fractions removed by sieving from a range of beads from polystyrene beads produced in a suspension polymerization reaction and comprising blowing agent. The polystyrene melt comprising blowing agent, and comprising at least one flame retardant, athermanous particles, and, if appropriate, further components is extruded and comminuted to give pellets comprising blowing agent. Since graphite in particular has marked nucleating action, the product should be rapidly cooled under pressure after extrusion, in order to avoid foaming. It is therefore advantageous to carry out underwater pelletization under pressure. If the polymer melt is not treated under pressure, foaming of the expandable styrene polymer occurs, forming expanded styrene polymer beads or a foam. In one preferred embodiment, this direct foaming takes place via extrusion of the melt comprising blowing agent through an appropriate die, thus directly forming foam sheets of the desired size from the expandable styrene polymer. In another embodiment, the melt is extruded through another suitable die to form expanded beads composed of the expandable styrene polymer.

The present invention therefore also provides a process for the production of an expanded styrene polymer bead of the invention, where an expandable styrene polymer of the invention is foamed.

The present invention also provides an expanded styrene polymer bead comprising at least one flame retardant as component (A), from 0.0001 to 2% by weight, based on component (A), of at least one metal as component (B), and athermanous particles as component (C), preferably capable of production according to the process of the invention. In relation to the individual features and to the preferred embodiments, the statements made in relation to the expandable styrene polymer beads are applicable to the expanded styrene polymer beads of the invention.

It is also possible to add the blowing agent in a separate step of a process to the styrene polymers which comprise the at least one flame retardant, athermanous particles, and, if appropriate, further components. The pellets here are preferably impregnated in aqueous suspension with the blowing agent.

The at least one flame retardant, athermanous particles, and, if appropriate, further components can be added directly to the polymer melt. It is also possible that the form in which the at least one flame retardant, athermanous particles, and, if appropriate, further components are added to the melt is that of a concentrate in the appropriate polystyrene. However, it is preferable that polystyrene pellets, and the at least one flame retardant, athermanous particles, and, if appropriate, further components are together added to an extruder, and that the polymer is melted, and mixed with the at least one flame retardant, athermanous particles, and, if appropriate, further components.

It is also possible, in principle, to incorporate the at least one flame retardant, athermanous particles, and, if appropriate, further components before the suspension polymerization reaction has finished. They can be added here to the monomers prior to suspension, or can be added to the reaction mixture during the course of the polymerization cycle, preferably during the first half thereof. The blowing agent is preferably added during the course of the polymerization reaction, but it can also be added to the polymer afterward. It is advantageous for the stability of the suspension that a solution of polymer, or of an appropriate copolymer, in the monomer, or in the mixture of monomer and the appropriate comonomer(s), is present at the start of the suspension polymerization reaction. It is preferable here to start from a solution of polystyrene in the styrene, where the concentration of the polystyrene in styrene is generally from 0.5 to 30% by weight, preferably from 5 to 20% by weight. It is possible here to dissolve virgin polystyrene in the styrene, but it is advantageous to use what are known as marginal fractions which are beads of excessive or insufficient size that are removed by sieving when the range of beads produced during production of expandable polystyrene is fractionated. The diameters of these non-usable marginal fractions in practice are greater than 2.0 mm or smaller than 0.2 mm. It is also possible to use recycled polystyrene and recycled polystyrene foam. Another possibility consists in prepolymerizing styrene in bulk up to a conversion of from 0.5 to 70% and suspending the pre-polymer together with the athermanous particles in the aqueous phase and polymerizing to completion.

The amounts added of the blowing agent are conventional: from about 1 to 10% by weight, based on the weight of the thermoplastic polymer. Blowing agents usually used are aliphatic hydrocarbons having from 3 to 10, preferably from 4 to 6, carbon atoms, e.g. n-pentane, isopentane, or a mixture thereof.

The expandable styrene polymer of the invention can be processed to give foams with densities which are preferably from 5 to 200 g/l, particularly preferably from 8 to 100 g/l, and in particular from 10 to 80 g/l. The present invention therefore also provides a foam capable of production from the expandable styrene polymer of the invention.

In one preferred embodiment, the density of the foam of the invention is ≤35 g/l and its thermal conductivity has been lowered to the extent that it complies with the requirements of thermal conductivity class 035 (to DIN 18164, part 1, table 4).

The present invention also provides a process for the production of foams via production of an expandable styrene polymer of the invention via the process of the invention and foaming of this expandable styrene polymer.

The foaming of the expandable styrene polymers comprising blowing agent to give foams usually likewise takes place by the process known from the prior art, by pre-foaming them in a first step using steam in open or closed prefoamers, to give the appropriate expanded styrene polymers. The average particle size of the expanded beads is generally from 0.5 to 10 mm, in particular from 1 to 8 mm. The present invention also provides the expanded styrene polymers comprising the at least one flame retardant and, if appropriate, further components. In a second step, the prefoamed, expanded styrene polymers of the invention in the form of beads are then fused by means of steam in gas-permeable molds to give moldings or sheets.

The present invention also relates to the use of the foam of the invention for thermal insulation, for example of buildings or of parts of buildings, e.g. in perimeter insulation. The foams of the invention can be applied here to the external side of the parts to be insulated, or else to their internal side.

The present invention also provides the use of the foam of the invention for the thermal insulation of machines and of household devices, e.g. ovens, refrigerators, chest freezers, water boilers, or insulated flasks.

The present invention also provides the use of the foam of the invention as packaging material. The foam here can be used in particulate form, so that the article to be packed lies in a loose bed. It is also possible that a one-piece workpiece is produced from the foam of the invention, into which the article to be packed is embedded.

EXAMPLES

Example 1 (Comparison)

600 g of EPS marginal fraction are dissolved in 3100 g of styrene, and 110 g of pulverulent graphite (d50 grain size: 4.5 µm; bulk density 200 g/L; ash, determined to DIN 51903: 3.5% by weight) is suspended homogeneously with admixture of 2 g of tert-butyl peroctoate and 17 g of dicumyl peroxide, and also 35 g of hexabromocyclododecane (HBCD). The organic phase is introduced into 4.5 L of completely demineralized water in a 10 L stirred tank. The aqueous phase comprises 18 g of sodium pyrophosphate and 17 g of magnesium sulfate. The suspension is heated to 110° C. within a period of 150 minutes. 1 g of E30/40 emulsifier (Leuna-Tenside GmbH) is then added. After a further 80 minutes, 220 g of pentane are metered in and the polymerization is completed at 134° C. After removal of the aqueous phase and subsequent sieving, expandable beads are obtained. Metal content, based on HBCD, is 2.8% by weight.

The beads are prefoamed using steam and fused, after storage for one day, by further treatment with steam in a closed mold, to give foam blocks of density 15.1 g/L. Thermal conductivity to DIN 52612 is 31.5 mW/(m*K). The DIN 4102 B2 test is not passed.

Compressive stress for 10% compression is inadequate, being 50 kPa to DIN EN 826.

Example 2 (of the Invention)

The experiment is carried out as described in example 1, but 110 g of graphite with grain size d50 of 4.6 µm, bulk density of 200 g/L, and ash content, determined to DIN 51903, of 2% by weight are used. Metal content, based on HBCD, 0.2% by weight. Thermal conductivity, at density 15.3 g/L, is 31.3 mW/(m*K) to DIN 52612. The DIN 4102 B2 test is passed.

Compressive stress at 10% compression is 75 kPa to DIN EN 826.

Example 3 (Comparison)

2.0% by weight, based on polystyrene, of hexabromocyclododecane (HBCD) and 0.4% by weight based on polystyrene, of dicumyl are metered into a main stream of a polymer melt comprising blowing agent based on polystyrene with weight-average molar mass of 280 000 g/mol, 3.7% by weight, based on polystyrene, of graphite (grain size 4.7 µm; bulk density 200 g/L; ash, determined to DIN 51903: 3.7% by weight), and 7% by weight, based on polystyrene, of n-pentane, in an extruder. The resultant polymer melt is conveyed through a die plate and pelletized with the aid of a pressurized underwater pelletizer to give expandable beads.

Beads whose average diameter is 1.1 mm are obtained. Metal content, based on HBCD, is 2.1% by weight. The beads are prefoamed using steam and fused, after storage for one day, by further treatment with steam in a closed mold, to give foam blocks of density 16.1 g/L. Thermal conductivity to DIN 52612 is 31.0 mW/(m*K). The DIN 4102 B2 test is not passed. Compressive stress at 10% compression is inadequate, being 60 kPa to DIN EN 826.

Example 4 (of the Invention)

The experiment is carried out as described in example 3, but graphite with grain size d50 of 4.5 µm, bulk density of 200 g/L, and ash content, determined to DIN 51903, of 0.5% by weight are used. Metal content, based on HBCD, 0.02% by weight. Thermal conductivity, at density 16.2 g/L, is 31.0 mW/(m*K) to DIN 52612. The DIN 4102 B2 test is passed. Compressive stress at 10% compression is 85 kPa to DIN EN 826.

Example 5 (of the Invention)

The experiment is carried out as described in example 3, but graphite with grain size d50 of 7 µm, bulk density of 300 g/L, and ash content, determined to DIN 51903, of 3.5% by weight are used. Metal content, based on HBCD, 0.5% by weight. Thermal conductivity, at density 16.5 g/L, is 32.8 mW/(m*K) to DIN 52612. The DIN 4102 B2 test is passed. Compressive stress at 10% compression is 83 kPa to DIN EN 826.

The invention claimed is:

1. An expandable styrene polymer, comprising at least one flame retardant as component (A), from 0.0001 to 2% by weight, based on component (A), of at least one metal as component (B), and athermanous particles as component (C).

2. The styrene polymer according to claim 1, which is a styrene homopolymer or a styrene copolymer having up to 40% by weight, based on the weight of the polymer, of at least one further ethylenically unsaturated monomer.

3. The styrene polymer according to claim 1, wherein the at least one flame retardant is an organic bromine compound.

4. The styrene polymer according to claim 1, wherein the at least one metal has been selected from the group consisting of iron, copper, molybdenum, zirconium, and mixtures thereof.

5. The styrene polymer according to claim 1, wherein the at least one flame retardant is hexabromocyclododecane (HBCD).

6. The styrene polymer according to claim 1, wherein the athermanous particles are graphite.

7. A process for the production of the expandable styrene polymer according to claim 1, via mixing of the expandable styrene polymer, of the at least one flame retardant as component (A), and of the athermanous particles as component (C), where from 0.0001 to 2% by weight, based on component (A), of at least one metal is present as component (B).

8. An expanded styrene polymer bead, comprising at least one flame retardant as component (A), from 0.0001 to 2% by weight, based on component (A), of at least one metal as component (B), and athermanous particles as component (C).

9. A process for the production of an expanded styrene polymer bead comprising at least one flame retardant as component (A), from 0.0001 to 2% by weight, based on component (A), of at least one metal as component (B), and athermanous particles as component (C), the process comprising foaming an expandable styrene polymer according to claim 1.

10. A foam, capable of production from the expandable styrene polymer according to claim 1.

11. A process for the production of a foam according to claim 10, via production of an expandable styrene polymer comprising at least one flame retardant as component (A), from 0.0001 to 2% by weight, based on component (A), of at least one metal as component (B), and athermanous particles as component (C) and foaming of this expandable styrene polymer.

12. A thermal insulation, including that of machines and of household devices, or a packaging material comprising the foam according to claim 10.

\* \* \* \* \*